Feb. 1, 1966   A. P. STERITI   3,232,389
SELF-ADJUSTING BRAKE
Filed May 1, 1964   2 Sheets-Sheet 1
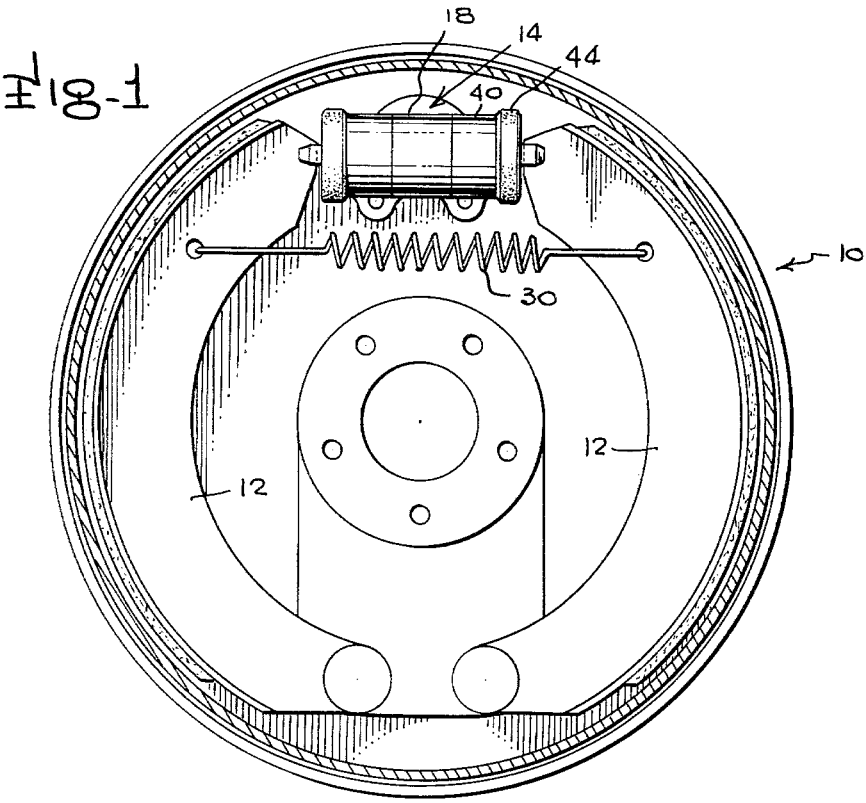
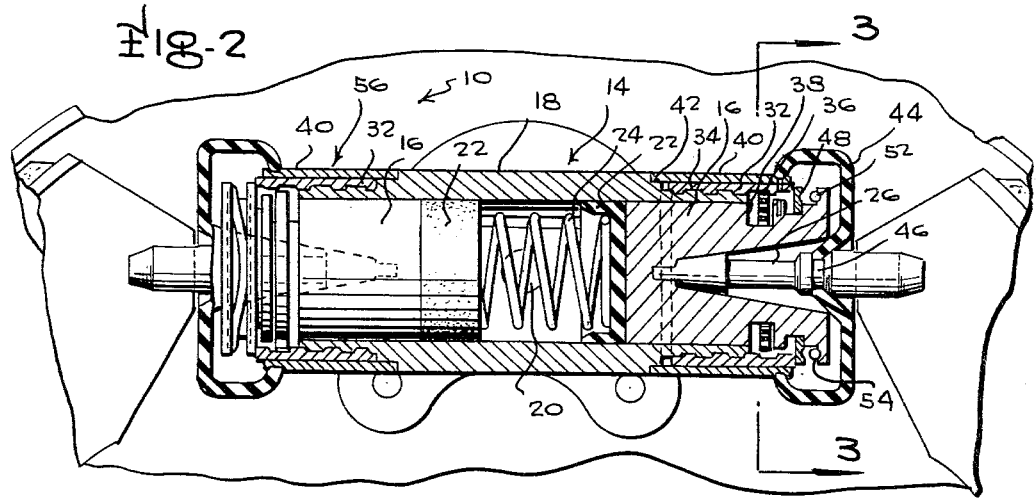
INVENTOR.
ANTHONY P. STERITI
BY
McMorrow, Berman & Davidson
ATTORNEYS

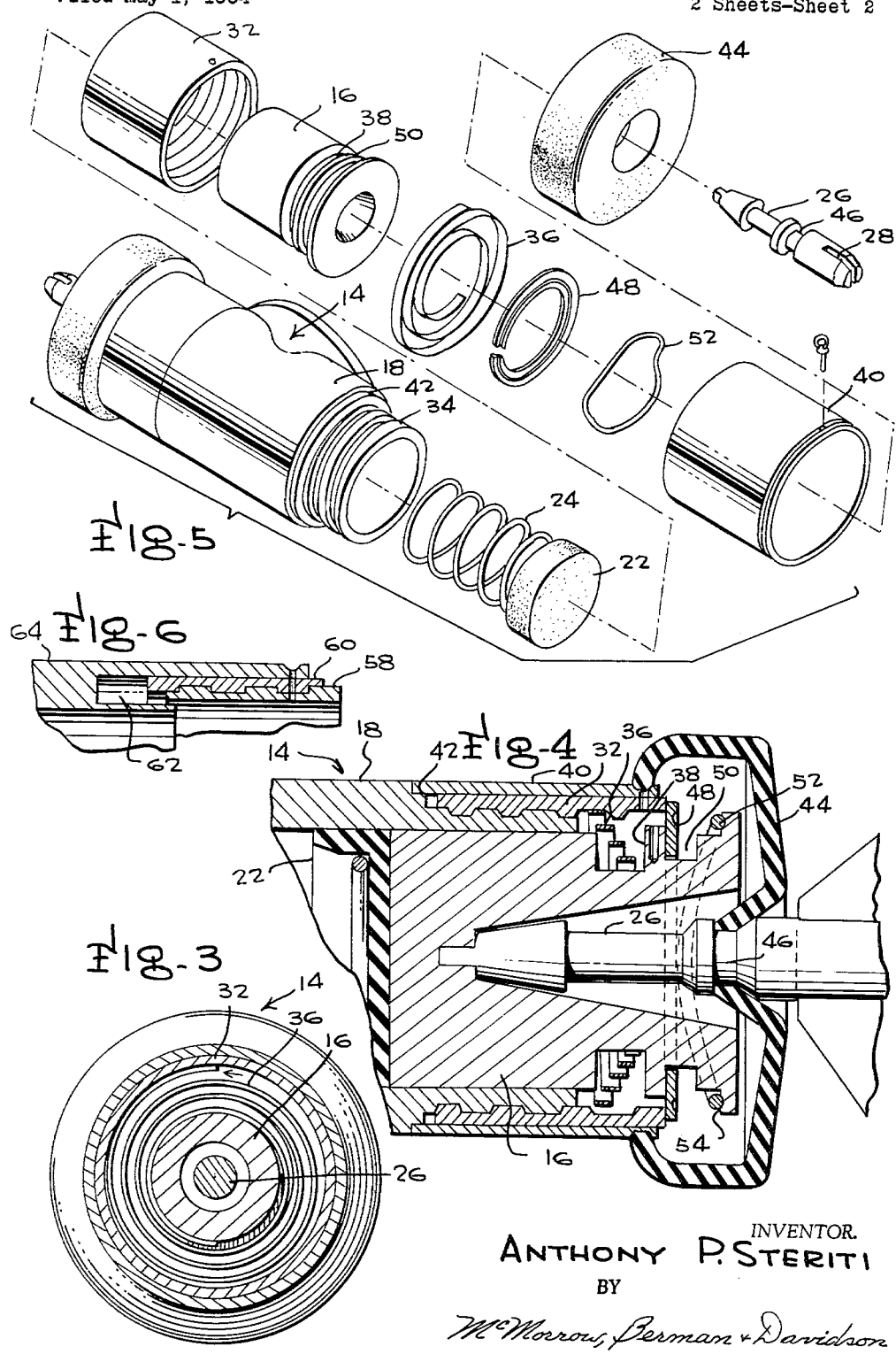

United States Patent Office 3,232,389
Patented Feb. 1, 1966

3,232,389
SELF-ADJUSTING BRAKE
Anthony P. Steriti, 689 Broadway, Chelsea, Mass.
Filed May 1, 1964, Ser. No. 364,209
4 Claims. (Cl. 188—79.5)

This invention relates to vehicle brakes, and in particular to a brake system in which brake lining wear is automatically compensated.

It is, therefore, a general object of the invention to provide automatic compensation for brake lining wear.

More particularly, it is an object to provide a self-adjusting means for brake wear, which means is contained within the thrust cylinder unit in the brake drum.

Yet another object is to provide self-adjustment which is operable whether the vehicle is in motion or at rest.

A still further object is to provide a self-adjustment which is uniformly operable on all four brakes simultaneously.

It is also an object to provide a self-adjustment system which meets the requirements of, and is, therefore, adapted for use on, all present-day brake systems.

The objects also include provision of a device which is relatively simple in structure, reliable in operation, easy to manufacture, and low in cost.

These and other objects, which will be apparent, are attained by the present invention, a preferred form of which is described in the following specification, as illustrated in the drawings, in which:

FIGURE 1 is a sectional view through a brake drum, showing the shoes and actuating cylinder within, in front elevation, FIGURE 2 is an axial, sectional view through the cylinder unit of FIGURE 1, enlarged in scale, FIGURE 3 is a transverse, sectional view through the cylinder unit, taken on the plane of the line 3—3 of FIGURE 2, FIGURE 4 is a fragmentary view of the right-hand end of the cylinder of FIGURE 2, still further enlarged, and showing an adjusted position of the parts, FIGURE 5 is a bracketed view, in perspective, showing the parts of the cylinder unit, in exploded form, and FIGURE 6 is a fragmentary, sectional view, showing a modification.

Referring to the drawings by characters of reference there is shown in FIGURE 1, a brake drum, indicated generally by the numeral 10, with conventional, inner brake shoes 12, actuated by a cylinder unit 14, which, in outward structure and appearance, is also conventional. However, as will be seen, the self-adjusting feature for the brake shoes is contained within the unit 14.

Referring to FIGURE 2, the inner structure of the cylinder unit is seen as also comprising certain generally conventional elements, such as the pair of opposed pistons 16, slidable in an outer cylinder 18, and actuable by hydraulic fluid conducted through a port 20 in the cylinder. Fluid leakage around the cylinders is prevented by rubber boots 22, held in place by a central, compression spring 24, which also tends to separate pistons 16. Each piston carries a pin 26, lodged in a conical recess in its end face, and the pins are forked by an end slot 28, adapted to engage shoes 12, in thrust-communicating relationship. A tension coil spring 30 normally holds the brake shoes retracted from braking position, which entails approach of pistons 16, and normally there is provided a stop means, limiting inward movement of the pistons, and thus defining the play, or clearance of the brake shoes. It is this stop position which is usually laboriously and crudely adjusted by hand, but which, according to the present invention is attained automatically, constantly, smoothly, and accurately by means acting in direct response to wear in the brake lining.

Generally speaking, the self-adjusting means comprises a stop in the form of a movable sleeve, a floating ring arranged for limited axial movement while contacting the sleeve under spring pressure, and said sleeve being adjustable by loaded spring means when contact with said ring is lost, due to lining wear.

Particularizing the description of the self-adjusting means, the movable sleeve 32 is seen as comprising internal threads, which engage with external threads 34, on a reduced neck portion at the ends of cylinder 18, thus providing for the required axial adjustment of sleeve 32. Since both ends of the cylinder are identical, only one need be described. A spiral spring 36 surrounds the piston 16 and has one end attached to the sleeve 32 and has the other end attached to the bottom of a groove 35 provided in the piston 16. Rotation of the threaded sleeve 52 is effected by the spring 36. An outer sleeve 40, surrounding adjustable sleeve 32, is secured to cylinder 18 by suitable means, such as a press fit on annular stepped portion 42 of the cylinder. A rubber dust cap 44 engages sleeve 40 at its outer edge, and a groove 46 in pin 26 at its central aperture.

A most important element of the invention is the flat-band ring 48, floatingly mounted in an annular groove 50 in piston 16. This ring is split, in order to enable slipping it over the piston and into the groove. Ring 48 is normally urged inward by a spring ring 52, reacting against an annular, rabbeted portion 54 near the outer end of piston 16. Ring 48 floats axially in groove 50, and the amount of axial movement, or difference between the thickness of the ring and width of the groove, is equal to the desired clearance, or play, in the brake shoe. This may be 25–70 thousandths of an inch.

With brakes off, the situation is shown in FIGURE 2, wherein the pistons are forced inward by spring 30, and ring or band 48 is at the outer limit of travel in groove 50, due to contact with the end edge of adjustable sleeve 32. This movement of the ring is against the pressure of spring ring 52, which is of less strength than spring 30.

When the brakes are applied, the piston 16 moves outwardly, but ring 48 remains behind, due to pressure of spring ring 52. Prior to and during this relative movement, sleeve 32 is prevented from rotating by the frictional force of ring 48, as applied by spring ring 52. If application of the brakes is effected when ring 48 reaches the inner wall of groove 50, the clearance, or play of the brake shoe is correct. However, if the lining is worn, and the clearance therefore increased, the resulting, extra, outer movement of piston 16 will move ring 48 outward, away from its frictional contact with the end of adjustable sleeve 32, whereupon spring 36 causes sleeve 32 to rotate, to move axially outwardly, and re-establish contact with ring 48, which also results in re-establishment of the proper clearance, as determined by the play in slot 50. Until further substantial wear in the lining occurs, ring 48 will move to the inner end of slot 50 without releasing adjustable sleeve 32.

As seen to the left of FIGURE 2, the outer sleeve 40, adjustable sleeve 32, cylinder 18, and piston 16, have aligned bores 56, for reception of a pin or key, which keeps sleeve 32 from unwinding until the parts have been assembled in final, working position.

FIGURE 6 shows a modified, adjustable sleeve 58, with external threads mating with internal threads in a sleeve 60, the latter press fit in an annular groove 62 in the end edge of cylinder 64, the adjustable sleeve 58 being slidable in the said groove 62. Many other modifications of the adjustable sleeve are, of course possible, and the same is true of the other elements in the cylinder unit, wherefore the invention should not be deemed as limited except insofar as shell appear from the spirit and scope of the appended claims.

I claim:
1. A brake system of the type having swing-mounted shoes, and double-acting hydraulic cylinders, comprising a cylinder body, a sleeve movably-mounted on said body, means operatively-connected to said sleeve and said body to adjust movement of said sleeve, a piston in said cylinder, a ring arranged for limited axial movement along said piston and adapted to contact said sleeve, and spring means urging said ring into contact with said sleeve, said adjusting means adapted to move said sleeve in the absence of contact of said sleeve by said ring, said sleeve having a threaded connection with said cylinder body, and said adjusting means comprising a spiral spring, with one end connected to said sleeve, and the other end connected to said piston.

2. A brake system of the type having swing-mounted shoes, and double-acting hydraulic cylinders, comprising a cylinder body, a sleeve in said body, adjustable axially thereof, means to adjust said sleeve, a piston in said cylinder, a ring arranged for limited axial movement along said piston and adapted to contact said sleeve, and spring means urging said ring into contact with said sleeve, said adjusting means adapted to move said sleeve in the absence of contact of said sleeve by said ring, said sleeve having a threaded connection with said cylinder body, said adjusting means comprising a spiral spring, with one end connected to said sleeve, and the other end connected to said piston, and spring means comprising a spring ring carried by said piston.

3. A brake system of the type having swing-mounted shoes, and double-acting hydraulic cylinders, comprising a cylinder body, a sleeve in said body, adjustable axially thereof, means to adjust said sleeve, a piston in said cylinder, a ring arranged for limited axial movement along said piston and adapted to contact said sleeve, and spring means urging said ring into contact with said sleeve, said adjusting means adapted to move said sleeve in the absence of contact of said sleeve by said ring, said sleeve having a threaded connection with said cylinder body, said adjusting means comprising a spiral spring, with one end connected to said sleeve, and the other end connected to said piston, said spring means comprising a spring ring carried by said piston, and said ring being split.

4. A brake system of the type having swing-mounted shoes, and double-acting hydraulic cylinders, comprising a cylinder body, a sleeve in said body, adjustable axially thereof, means to adjust said sleeve, a piston in said cylinder, a ring arranged for limited axial movement along said piston and adapted to contact said sleeve, and spring means urging said ring into contact with said sleeve, said adjusting means adapted to move said sleeve in the absence of contact of said sleeve by said ring, said sleeve having a threaded connection with said cylinder body, said adjusting means comprising a spiral spring, with one end connected to said sleeve, and the other end connected to said piston, said spring means comprising a spring ring carried by said piston, said ring being split, and said ring being mounted in a groove in said piston, said groove being wider than the thickness of said ring.

References Cited by the Examiner
UNITED STATES PATENTS 2,196,799 4/1940 Keplinger _____ 188—79.5
3,115,955 12/1963 Knocke _____ 188—196 X FERGUS S. MIDDLETON, *Primary Examiner.*

DUANE A. REGER, *Examiner.*